Figures 1, 2:
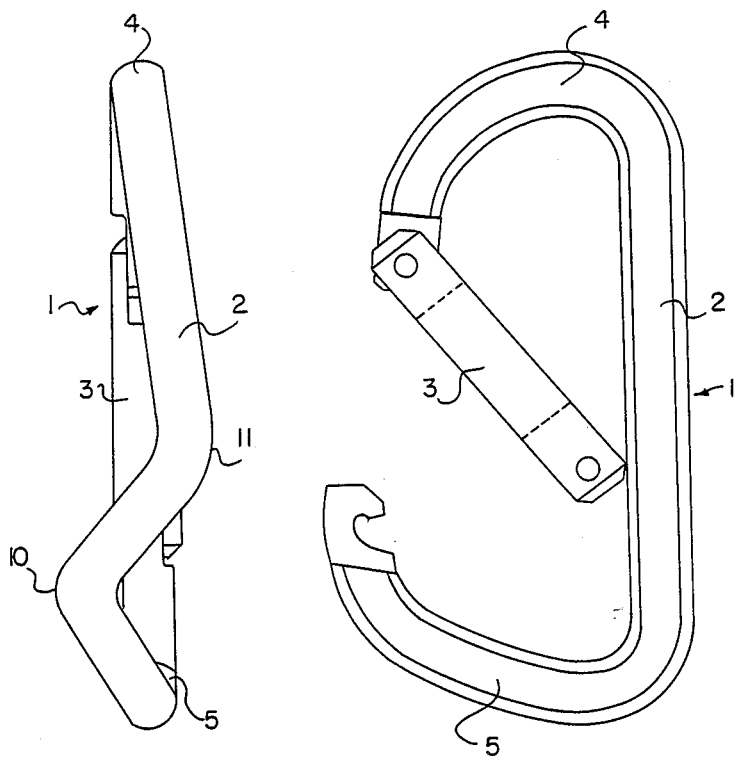

United States Patent [19]

Engers

[11] Patent Number: 4,819,304

[45] Date of Patent: Apr. 11, 1989

[54] SNAP HOOK, ESPECIALLY FOR MOUNTAIN CLIMBERS

[75] Inventor: Stefan Engers, Marl, Fed. Rep. of Germany

[73] Assignee: Stubai-Werkzeugindustrie RGenMBH, FulpmesTirol, Austria

[21] Appl. No.: 133,032

[22] PCT Filed: Mar. 23, 1987

[86] PCT No.: PCT/EP87/00162
§ 371 Date: Dec. 24, 1987
§ 102(e) Date: Dec. 24, 1987

[87] PCT Pub. No.: WO87/05817
PCT Pub. Date: Oct. 8, 1987

[30] Foreign Application Priority Data

Mar. 29, 1986 [DE] Fed. Rep. of Germany ....... 3610669

[51] Int. Cl.$^4$ ............................................. F16G 11/00
[52] U.S. Cl. ............................. 24/232 R; 24/115 K; 403/209
[58] Field of Search ........... 24/232 R, 241 P, 241 PP, 24/115 A, 115 H, 115 K; 403/206, 209

[56] References Cited

U.S. PATENT DOCUMENTS

| | | | |
|---|---|---|---|
| 608,970 | 8/1898 | Wood | 24/232 |
| 902,844 | 11/1908 | Shisler | 403/209 |
| 1,661,487 | 3/1928 | McCullar | 24/232 |
| 2,183,546 | 12/1939 | Colgrove | 403/209 |
| 2,709,438 | 5/1955 | Murray | 24/115 H |
| 4,337,554 | 7/1982 | Sevrence | 24/115 K |
| 4,398,336 | 8/1983 | Beuch | 24/115 A |

FOREIGN PATENT DOCUMENTS

| | | |
|---|---|---|
| 14687 | 1/1904 | Austria . |
| 1029557 | 6/1953 | France . |
| 2439330 | 5/1980 | France . |

Primary Examiner—Victor N. Sakran
Attorney, Agent, or Firm—Collard, Roe & Galgano

[57] ABSTRACT

There is provided a snap hook, especially for mountain climbers, consisting of a C-shaped element having ends which are connected to each other by an elastic locking catch to form a closed elongated ring having first and second narrow sides. A holding element is attached to a first narrow side and the second narrow side forms a guide region for a safety rope. Projecting elements are included in the elongated ring, projecting perpendicularly to the plane defined by the ring on both sides thereof, so that when the snap hook is applied against a planar surface, the guide region for the safety rope is maintained at a distance from the planar surface.

5 Claims, 4 Drawing Sheets

SNAP HOOK, ESPECIALLY FOR MOUNTAIN CLIMBERS

The invention concerns a snap hook, especially for mountain climbers, with a C-shaped element, the ends of which are connectable by a locking catch to form a closed elongate ring, to one narrow side of which a holding element is attached and to whose other narrow side a guide region is formed for a safety rope.

Snap hooks, of the kind indicated, are utilized by mountain climbers to secure the safety rope used during climbing to a more or less suitable cliff-side. For this purpose, snap hooks are secured in position to anchoring areas in the cliff-side by means of holding elements more or less elongate in shape and consisting of flat, woven ribbon-like material loops sewn together, such as hooks, clamp wedges or the like. The holding elements, which are of varying lengths, compensate for the divergent conditions of the anchoring areas along the rectilinear course of the rope so that the rope undergoes minimal twisting and so that the advancing mountain climber can easily pull the rope up.

The holding elements attach respectively to one narrow side of the snap. At the opposing narrow side of the snap hook there is a guide region for the safety rope around which the safety rope, in the event of a fall, is drawn with great force. For this reason, this guide region is generally rounded in profile so that the safety rope, in the event of fall, can be guide-turned around with the least possible frictional resistance and abrasion.

A drawback of the snap hook known in the state of the art, of the kind initially described, is that the safety rope, in the event of a fall, becomes trapped with relatively great force between the guide region and the cliff-side. This results in the safety cable's being abraded and damaged by the rough surface of the cliff, possibly causing tearing of the rope. The uncontrollable braking effects produced by the trapping of the safety rope further prevent timely response of the dynamic braking mechanism frequently employed of late at the beginning of the safety rope. The braking mechanism, therefore, is often unable to adequately absorb the energy generated by the fall, thus significantly increasing the risk of injury.

The task of the subject invention is to further develop the snap hook initially described such that the safety rope, in the event of a fall, does not become trapped between the cliff-side and the guide region of the snap hook.

In resolving this task, the invention, taking the snap hook of the kind initially described at its point of departure, proposes providing the elongate ring with projections, bends or a twist which, when the ring is applied against a plane, keep the guide region at a distance from this latter plane.

By virtue of the measures proposed in accordance with the invention, the snap hook according to the invention ensures that there is always a distance between the guide region and the surface of application (surface of the cliff). The dimensions of this distance are, of course, ample enough to enable the safety rope to pass unobstructed between the surface of the cliff and the guide region. The safety rope can, therefore, no longer become trapped between the surface of the cliff and the guide portion, being thereby damaged or abraded. Also, the uncontrollable braking effects caused by the trapping of the rope no longer occur. Thus, where a dynamic braking mechanism is employed, the correct operation of this braking mechanism is assured.

An initial embodiment of the invention provides that the flange of the C-shaped element is turned outward, in an upward and downward direction, vertical in relation to the principal extension plane of the ring. This ensures that the guide region is maintained at a distance from the cliff-side, independently of whichever side of the snap hook is applied against the cliff-side.

An alternate embodiment of the invention provides that the flange of the C-shaped element and/or the locking catch are vertically flared in relation to the principal extension plane of the ring. The addition of such flarings has the advantage that they can be added later to already existing snap hooks, for example, by attaching suitably shaped collars or the like.

A third embodiment of the invention provides that the flange of the C-shaped element is twisted around its longitudinal axis. This embodiment of the snap hook according to the invention has, like the two embodiments precedingly described, the advantage that the guide region remains raised above the surface of the cliff-side whatever the position of the snap hook. A further advantage results from the fact that the locking catch can be swiveled past the opposing flange of the C-shaped element so that a larger aperture results and the safety rope can be more easily engaged.

Without departing from the basic concept of the invention, other configurations of the snap hook, in addition to the three embodiments expressly described above, are conceivable, pursuant to which embodiments the guide region for the safety rope is maintained at a distance to the plane of support (surface of cliff-side).

Figure 3:
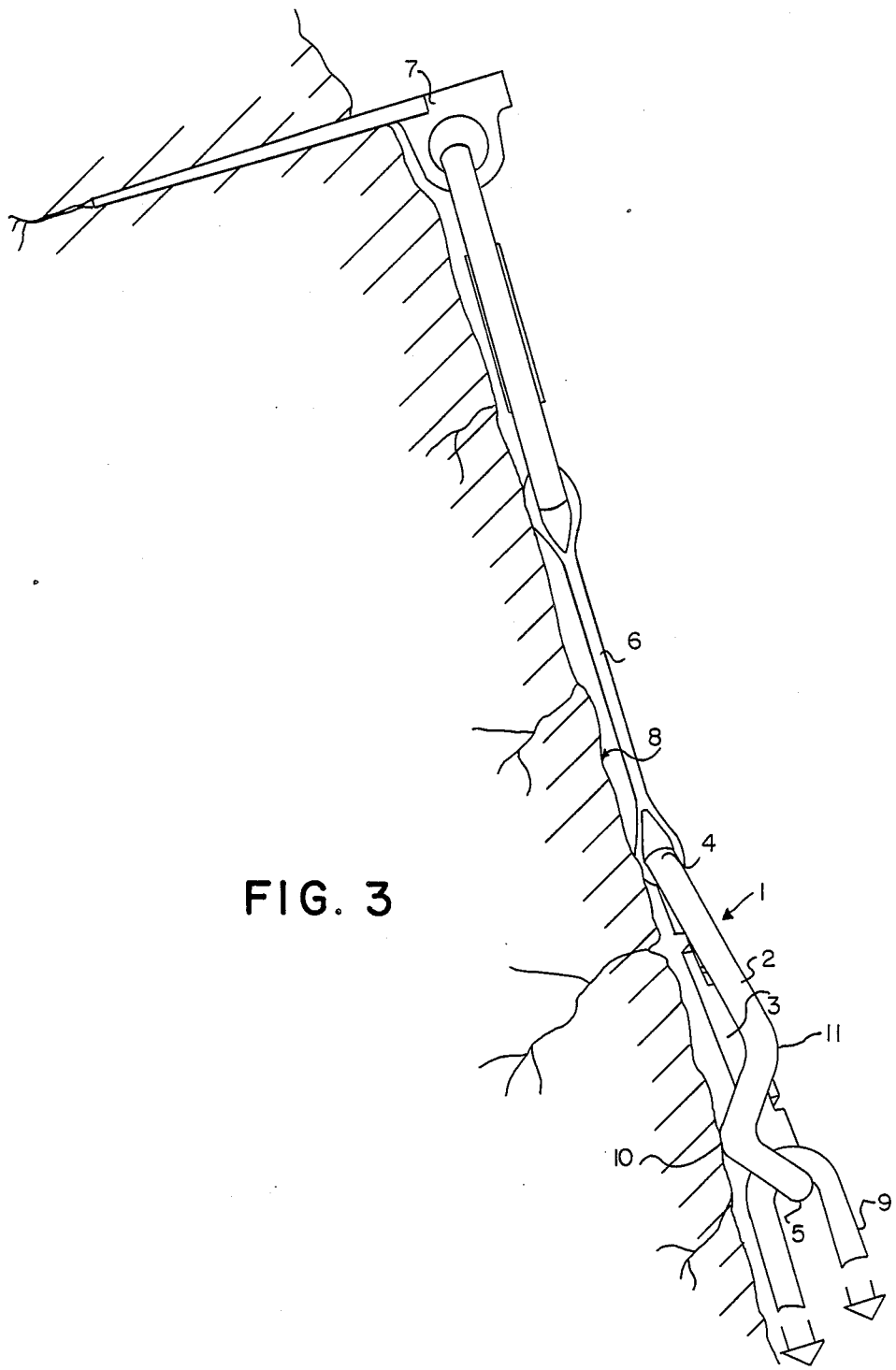
Figures 4, 5:
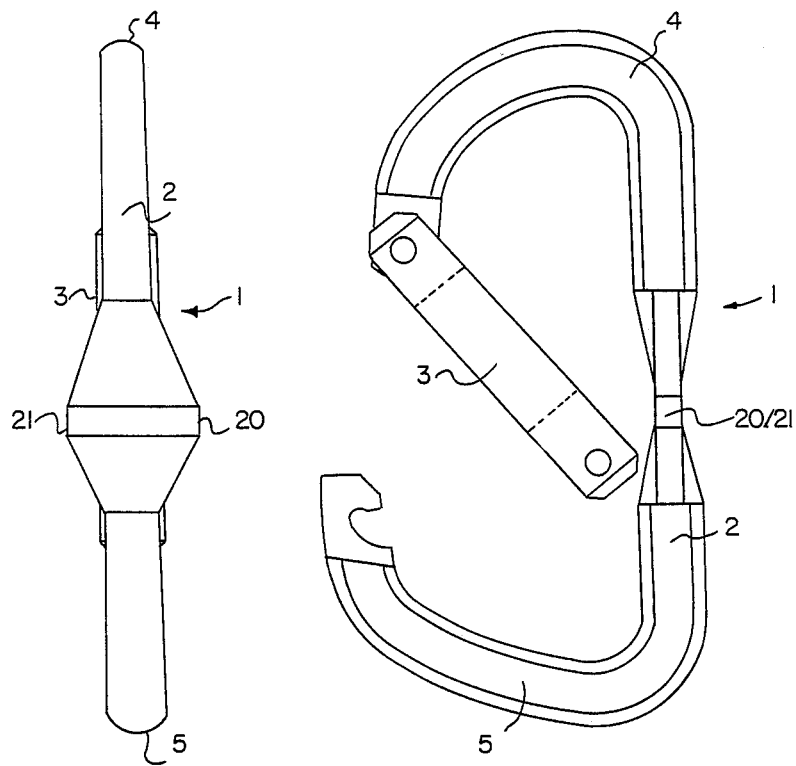
Figure 7:
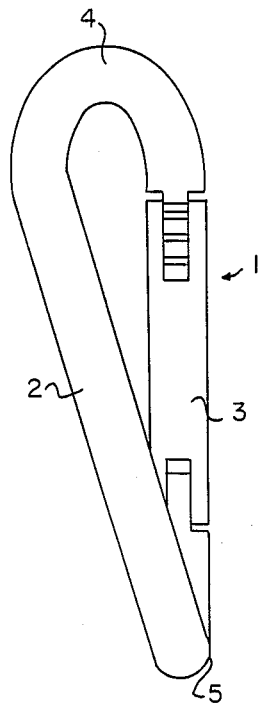
Figure 6:
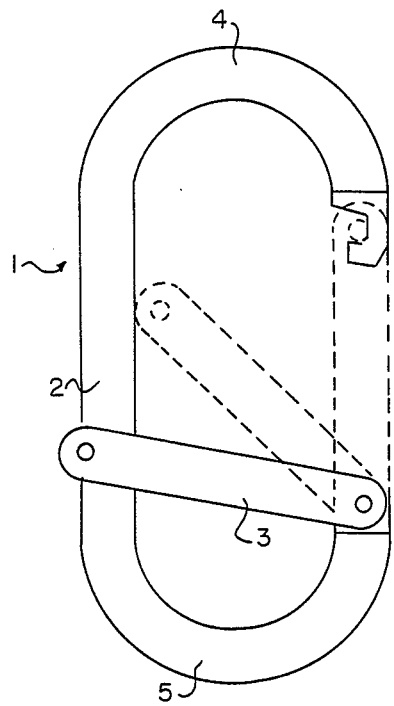
Figure 8:
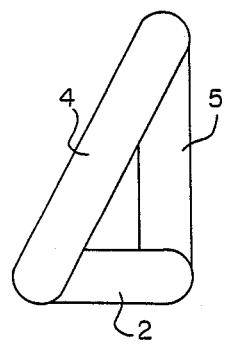

The three above-mentioned embodiments of the invention are hereinafter described in more detail with the aid of drawings. Shown in FIG. 1 is a side-view of snap hook according the invention;
FIG. 2 a top view of FIG. 1;
FIG. 3 a practical application of the snap hook according to FIG. 1 and FIG. 2;
FIG. 4 a side-view of snap hook according to the invention in a second embodiment;
FIG. 5 a top view of FIG. 4;
FIG. 6 a side view of snap hook according to the invention in a third embodiment;
FIG. 7 a top view of FIG. 6;
FIG. 8 a frontal view of FIG. 6.

The snap hook shown in FIGS. 1 through 3 exhibits a C-shaped element 1, whose flange is designated by reference identification 2, the ends of which are connectable by a locking catch 3 to form a closed, elongate ring. The elongate ring exhibits an upper narrow side 4 and a lower narrow side 5. At the upper narrow edge 4 a holding element 6 is attached (cf. FIG. 3), which consists of loops of flat, woven ribbon-like material sewn together. The holding element 6 itself is secured to a rock anchor 7 which is anchored to the side of the cliff. The lower narrow side 5 of the elongate ring 1,3 forms the guide region for the safety rope which extends around this guide region.

As can be seen from FIGS. 1 and 3, the flange 2 of the C-shaped element 1 is turned outward, in an upward and downward direction, vertical in relation to the principal extension plane of the ring. These bends 10 and 11 are configured such that the guide region at the narrow side 5 of the ring, when the ring is applied against a plane (surface of the cliff-side 8) keep the guide region at a distance from this latter plane (cf., in particular, FIG. 3). This distance is greater than the thickness of the safety rope 9, so that the safety rope can pass unobstructed around the guide region at the lower narrow side 5, without becoming trapped between this guide region and the cliff-side 8.

As can be seen from FIG. 3, the same conditions would result when the snap hook, rotated 180° around its longitudinal axis, rests against the cliff-side 8.

In the embodiments shown in FIGS. 4 and 5, the flange 2 of the C-shaped element 1 is vertically flared in relation to the principal extension plane of the ring. These flarings 20 and 21 also raise the guide region located at the narrow side 5 above the application plane to the degee required. Where appropriate, in this embodiment the locking catch 3 can also be provided with corresponding flarings. These flarings on the flange 2 or the locking catch 3 can, if appropriate, be added after the fact.

In the embodiment shown in FIGS. 6 through 8, the flange 2 of the C-shaped element 1 is twisted around its longitudinal axis such that here, too, the guide region located at narrow side 5 is raised sufficiently above a level support surface. This embodiment has the particular advantage that the locking catch 3 can be swiveled past the opposing flange 2. In this way the snap hook can be opened wider and the safety rope correspondingly more easily inserted.

I claim:

1. In a snap hook, especially for mountain climbers, consisting of a C-shaped element having ends which are connected to each other by an elastic locking catch to form a closed, elongate ring, generally defining a plane, with first and second narrow sides interconnected by a flange element and said locking catch, a holding element being attachable to a first narrow side and the second narrow side forming a guide region for a safety rope, the improvement comprising:

projecting means included in said elongate ring projecting perpendicular to the plane of said elongate ring on both sides thereof so that when the elongate ring is applied against a planar surface, the guide region is maintained at a distance therefrom, sufficient to give clearance to said safety rope.

2. The snap hook as defined in claim 1, wherein said projecting means comprises first and second opposing bends in said flange element of said elongate ring extending perpendicular to said elongate ring plane on both sides thereof.

3. The snap hook as defined in claim 1, wherein said projecting means comprises vertical flares formed in said flange of said elongate ring and extending perpendicular to said elongate ring plane on both sides thereof.

4. The snap hook as defined in claim 1, wherein said projecting means comprises vertical flares formed in said locking catch and extending perpendicular to said elongate ring plane on both sides thereof.

5. The snap hook as defined in claim 1, wherein said projecting means is formed by twisting the flange of the elongate ring around its longitudinal axis.

* * * * *